April 30, 1929.  G. A. JEFFREYS  1,711,352
TRACHEAL SWAB SYRINGE
Filed Jan. 12, 1928
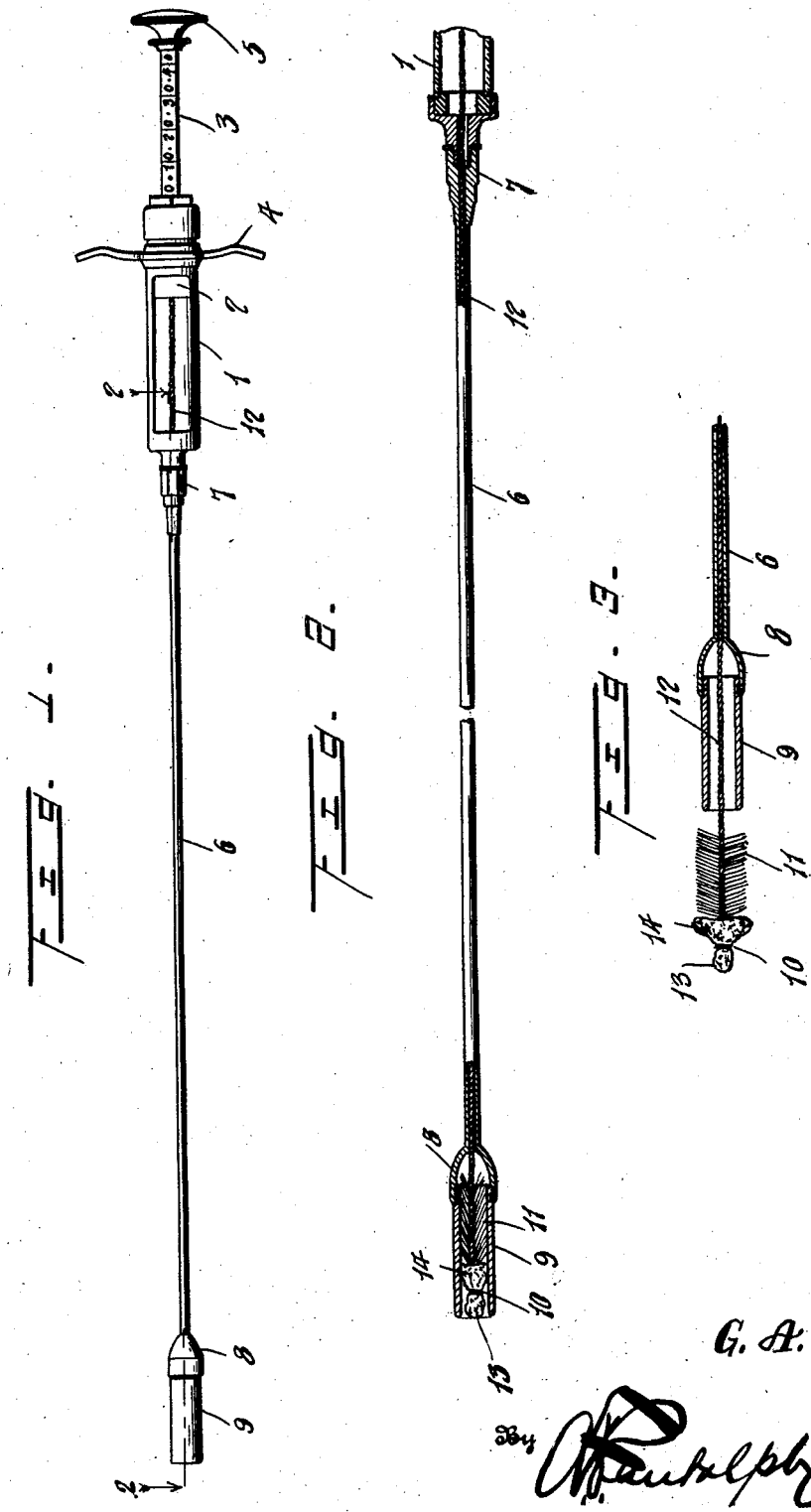
Inventor
G. A. Jeffreys.
By
Attorney Patented Apr. 30, 1929.

1,711,352

UNITED STATES PATENT OFFICE.

GEORGE A. JEFFREYS, OF CALCIUM, NEW YORK.

TRACHEAL-SWAB SYRINGE.

Application filed January 12, 1928. Serial No. 246,222.

This invention relates to an instrument adapted to be used for the purpose of applying a medicament in the treatment of silver foxes, dogs, cats, sheep and other animals afflicted with lungworms. In the treatment of this disease, it has, heretofore, been the practice to inject the medicament into the trachea from outside of the neck or to induce the animal to inhale vapors of the medicament or to spray the trachea with the medicament. It is well recognized that these methods of applying the medicament are severally and jointly ineffective for the reason that the parasites or worms responsible for the disease are protected from the action of the medicament by a thick mucus in which they lie embedded and which coats the lower side of the trachea generally near the larynx.

The invention has for one of its objects to provide an instrument of the character stated which shall be adapted to permit the medicament to be inserted directly into the trachea in the most effective manner and without danger of flooding the lungs.

The invention has for a further object to provide an instrument of the character stated which shall be adapted, during the application of the medicament, to break up the mucus and ensnare many of the worms, whereby to permit the removal of many of the worms from the trachea and to expose the remaining worms in the trachea in such manner as to result in their being killed by the action of the medicament.

With the foregoing and other objects in view, the nature of which will appear as the description proceeds, the invention consists in the construction, combination and arrangement of parts hereinafter fully described and claimed, and illustrated in the accompanying drawing, wherein:

Figure 1 is a view in side elevation of the instrument in condition for use,

Figure 2 is a sectional view taken on the plane indicated by the line 2—2 of Figure 1, and Figure 3 is a sectional view of the forward end portion of the instrument with the parts thereof in the positions they occupy during the application of the medicament.

The instrument comprises a syringe which may be of any well known or appropriate construction and is shown as embodying a barrel 1, plunger 2 and plunger rod 3. The barrel 1 is provided with finger rests or grips 4, and the plunger rod 2 is provided with a thumb rest or button 5.

An elongated and flexible nozzle 6 is detachably secured to the barrel 1 by a coupling 7. The front end portion of the nozzle 6 is laterally enlarged to provide a coupling 8. A housing 9 is detachably connected to the coupling 8, and it is of cylindrical formation and fully open at its ends.

An applicator 10 and a brush 11 are secured to a flexible stem 12. The applicator 10 is preferably made from sponge, and it is secured to the front end of the stem 12. It has a reduced, substantially spherical, front entering portion 13 and an expanded conical rear portion 14, the latter portion, forming a swab extending laterally beyond the former portion. The brush 11 is of cylindrical formation and secured to the stem 12 immediately in rear of the applicator 10, and the bristles of the brush incline slightly in a rearward direction. The stem 12 is flexible and made from intertwisted strands of wire. It is longer than and slidably mounted in the nozzle 6, and it has sufficient frictional contact with the nozzle to prevent it from being casually withdrawn therefrom. This frictional contact between the stem 12 and the nozzle 6 results from the formation of the former from intertwisted strands of wire, and should the frictional contact be reduced as the result of the repeated use of the instrument it may be restored by separating the strands of wire at or near the center of the stem. The front end of the stem 12 contacts with but is not connected to the plunger 2, and when the plunger is in its rearmost position the stem extends from the plunger to the front end of the housing 9 within which the applicator 10 and brush 11 are located.

In practice, the syringe, the nozzle 6, the housing 9 and the stem 12 are carried in a case in disconnected relation. When it is desired to use the instrument, the nozzle 6 is first connected to the syringe, the syringe and nozzle 6 are then filled with the medicament in a manner to prevent the formation of an air pocket in the nozzle. The stem 12 is then inserted into the nozzle 6 and syringe while holding these parts in an inverted position, and thereafter the housing 9 is connected to the coupling 8. The parts of the instrument are now assembled in the manner illustrated in Figures 1 and 2. To apply the medicament, the animal's mouth is held open by means of a speculum, and its tongue is grasped with a cloth and gently pulled out to open the epiglottis which covers the opening of the larynx. After waiting for a few moments to permit this opening to widen, the front end of the instrument is gently slipped into the larynx and down to the trachea. When the front end of the instrument is near the bottom of the trachea, the plunger 2 is pushed half way inward, with the result that the applicator 10 and brush 11 are moved forwardly out of the housing 9 and some of the medicament is discharged into the trachea forwardly of the applicator and brush. The instrument is now slowly withdrawn and the plunger 2 is at the same time slowly moved forwardly in the barrel 1 to force the remainder of the medicament into the trachea. During the withdrawal of the instrument, the bristles of the brush 11 strip the mucus on the walls of the trachea in which the worms are embedded to expose them to the action of the medicament and ensnare many of the worms, with the result that many of the worms are removed from the trachea and the remaining worms in the trachea are so exposed to the action of the medicament that they are killed. Due to its construction, the applicator 10 may be easily and quickly withdrawn into the housing 9, and it will not, after being projected from the housing and during its withdrawal from the trachea, fold or collapse, with the result that it will distribute the medicament around the trachea and further, because of the absorbent nature and its expanded portion 14, the swab 10 will prevent the medicament from flooding the lungs.

From the foregoing description, taken in connection with the accompanying drawing, it should be understood that I have provided an instrument through the medium of which the disease known as lungworms may be effectively treated, that the instrument is capable of being conveniently used, and that the instrument is simple, highly efficient and capable of being manufactured and sold at a comparatively low cost. It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. An instrument of the character set forth, comprising a barrel, a plunger therein, means for operating the plunger, a nozzle connected to the barrel, a housing connected to the front end of the nozzle, a stem slidably mounted in the nozzle and contacting with the plunger, and an applicator secured to the stem and arranged within the housing, said applicator being adapted to be entirely withdrawn within the housing for insertion of the instrument.

2. An instrument of the character set forth, comprising a barrel, a plunger therein, means for operating the plunger, a nozzle connected to the barrel, a housing connected to the front end of the nozzle, a stem slidably mounted in the nozzle and contacting with the plunger, and an applicator and brush secured to the stem and located within the housing, said applicator and brush being adapted to be entirely withdrawn within the housing for insertion of the instrument.

3. An instrument of the character set forth, comprising a barrel, a plunger therein, means for operating the plunger, a nozzle connected to the barrel, a housing connected to the front end of the nozzle, a stem slidably mounted in and frictionally contacting with the nozzle, the stem contacting with the plunger, and an applicator and brush secured to the stem and located within the housing, said applicator and brush being adapted to be entirely withdrawn within the housing for insertion of the instrument.

4. An instrument of the character set forth, comprising means adapted to inject a medicament into the trachea of an animal and means adapted to strip the mucus from the wall of the trachea during the injection of the medicament to expose parasites embedded in the mucus to the effects thereof.

5. An instrument of the character set forth, comprising means adapted to inject a medicament into the trachea of an animal, means adapted to strip the mucus from the walls of the trachea during the application of the medicament to expose parasites embedded in the mucus to the effects thereof, and means adapted to spread the medicament along the trachea during the stripping of the mucus.

6. An instrument of the character set forth, comprising means adapted to inject a medicament into the trachea of an animal and means adapted to strip the mucus from the walls of the trachea to expose lung worms embedded therein to the effects of the medicament and ensnare many of the worms during the injection of the medicament.

7. An instrument of the character set forth, comprising means adapted to inject a medicament into the trachea of an animal, means adapted to strip the mucus from the walls of the trachea during the application of the medicament to expose parasites embedded in the mucus to the effects thereof, and means adapted to spread the medicament along the trachea during the breaking up of the mucus and prevent the medicament from flooding the lungs.

In testimony whereof I affix my signature.

GEORGE A. JEFFREYS.